United States Patent
Hensley et al.

(10) Patent No.: US 10,517,352 B2
(45) Date of Patent: Dec. 31, 2019

(54) METHOD OF MANUFACTURING A BLADDER ELEMENT WITH AN ETCHED FEATURE AND ARTICLE HAVING A BLADDER ELEMENT WITH AN ETCHED FEATURE

(71) Applicant: NIKE, Inc., Beaverton, OR (US)

(72) Inventors: Taryn Hensley, Portland, OR (US); Dervin A. James, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 52 days.

(21) Appl. No.: 15/958,116

(22) Filed: Apr. 20, 2018

(65) Prior Publication Data

US 2018/0235315 A1 Aug. 23, 2018

Related U.S. Application Data

(63) Continuation of application No. 15/093,095, filed on Apr. 7, 2016, now Pat. No. 9,974,360.

(Continued)

(51) Int. Cl.
*A43B 13/20* (2006.01)
*A43B 1/00* (2006.01)
*A43B 3/00* (2006.01)
*A43B 23/24* (2006.01)
*B29D 35/12* (2010.01)
*B29D 35/14* (2010.01)
(Continued)

(52) U.S. Cl.
CPC ............ *A43B 13/20* (2013.01); *A43B 1/0072* (2013.01); *A43B 3/0078* (2013.01); *A43B 13/12* (2013.01); *A43B 13/203* (2013.01); *A43B 21/28* (2013.01); *A43B 23/24* (2013.01); *B29B 11/04* (2013.01); *B29B 13/00* (2013.01); *B29B 13/08* (2013.01); *B29C 49/0047* (2013.01); *B29C 49/4252* (2013.01); *B29D 35/122* (2013.01); *B29D 35/128* (2013.01); *B29D 35/148* (2013.01); *B29K 2075/00* (2013.01); *B29L 2031/504* (2013.01)

(58) Field of Classification Search
CPC ....... A43B 3/0078; A43B 13/20; A43B 21/28; A43B 23/24
USPC .................................................... 36/29, 35 B
See application file for complete search history.

(56) References Cited

U.S. PATENT DOCUMENTS 4,571,853 A 2/1986 Medrano
5,092,060 A * 3/1992 Frachey ............... A43B 1/0072
36/29
(Continued)

FOREIGN PATENT DOCUMENTS

CN 2183195 Y 11/1994
CN 101863394 A 10/2010
CN 102085026 A 6/2011

*Primary Examiner* — Marie D Bays
(74) *Attorney, Agent, or Firm* — Quinn IP Law

(57) ABSTRACT

A method of manufacturing an article comprises etching an etched feature on a surface of a first polymeric sheet, and forming a fluid-filled bladder element from the first polymeric sheet, with the fluid-filled bladder element having a sealable internal cavity that retains fluid. The method includes assembling the bladder element in the article so that a first portion of the bladder element having the etched feature is exposed to view, and a second portion of the bladder element is blocked from view by the article. An article includes the bladder element with the etched feature.

20 Claims, 7 Drawing Sheets

Related U.S. Application Data

(60) Provisional application No. 62/144,551, filed on Apr. 8, 2015.

(51) Int. Cl.
*A43B 21/28* (2006.01)
*A43B 13/12* (2006.01)
*B29B 11/04* (2006.01)
*B29B 13/00* (2006.01)
*B29B 13/08* (2006.01)
*B29C 49/00* (2006.01)
*B29C 49/42* (2006.01)
*B29K 75/00* (2006.01)
*B29L 31/50* (2006.01)

(56) References Cited

U.S. PATENT DOCUMENTS

| | | | |
|---|---|---|---|
| 5,815,950 A * | 10/1998 | Wang | A43B 1/0072 36/29 |
| 5,968,657 A | 10/1999 | Scullin et al. | |
| 6,009,637 A * | 1/2000 | Pavone | A43B 13/14 36/28 |
| 6,031,019 A | 2/2000 | Tsutsumi et al. | |
| 6,129,799 A | 10/2000 | McGraw | |
| 6,303,198 B1 * | 10/2001 | Chen | B44C 1/28 264/237 |
| 6,775,932 B2 * | 8/2004 | Lin | A43B 1/0072 206/522 |
| 6,790,391 B2 | 9/2004 | Watkins | |
| 7,131,218 B2 * | 11/2006 | Schindler | A43B 13/187 36/29 |
| 7,917,981 B1 | 4/2011 | Lakic | |
| 8,813,389 B2 | 8/2014 | Gishifu et al. | |
| 9,427,048 B2 * | 8/2016 | James | B29D 35/12 |
| 9,854,870 B2 * | 1/2018 | Hensley | A43B 13/12 |
| 9,974,360 B2 * | 5/2018 | Hensley | B29B 13/08 |
| 2004/0045192 A1 * | 3/2004 | Lin | A43B 1/0072 36/29 |
| 2004/0071936 A1 * | 4/2004 | Martelli | B29C 33/424 428/141 |
| 2011/0005101 A1 * | 1/2011 | Sills | A43B 1/0072 36/29 |
| 2011/0271552 A1 | 11/2011 | Peyton | |
| 2011/0277352 A1 | 11/2011 | Diepenbrock et al. | |
| 2012/0055044 A1 | 3/2012 | Dojan et al. | |
| 2012/0102783 A1 | 5/2012 | Swigart et al. | |
| 2013/0055595 A1 | 3/2013 | Brown | |
| 2013/0191969 A1 | 8/2013 | Goloveyko | |
| 2016/0295963 A1 * | 10/2016 | Chang | A43B 13/12 |
| 2016/0295964 A1 * | 10/2016 | Hensley | A43B 13/12 |
| 2016/0295965 A1 * | 10/2016 | Hensley | A43B 13/12 |
| 2016/0295966 A1 * | 10/2016 | Hensley | B29B 13/08 |

* cited by examiner

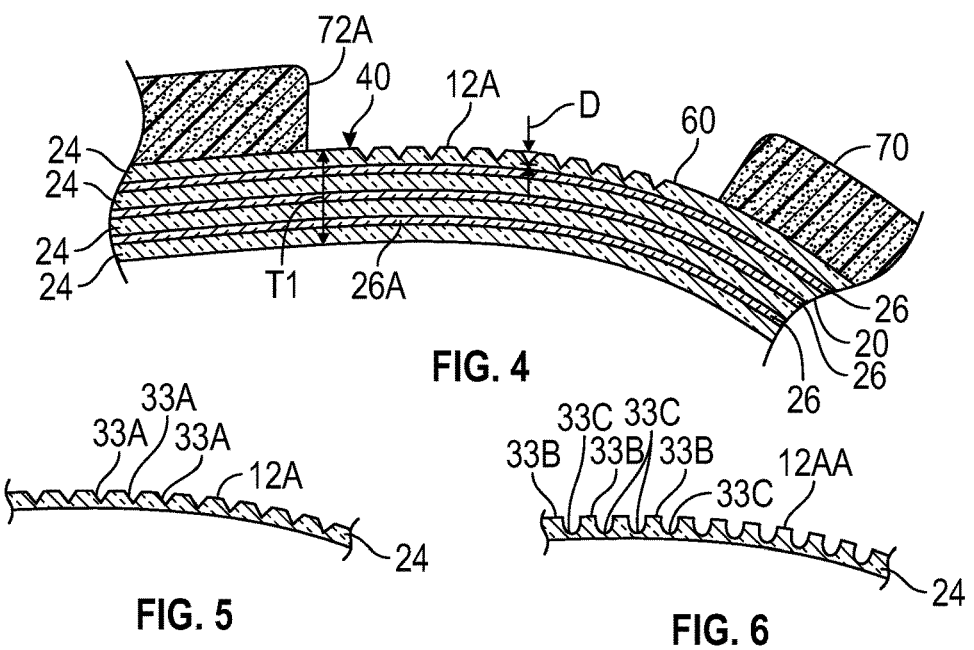
FIG. 4
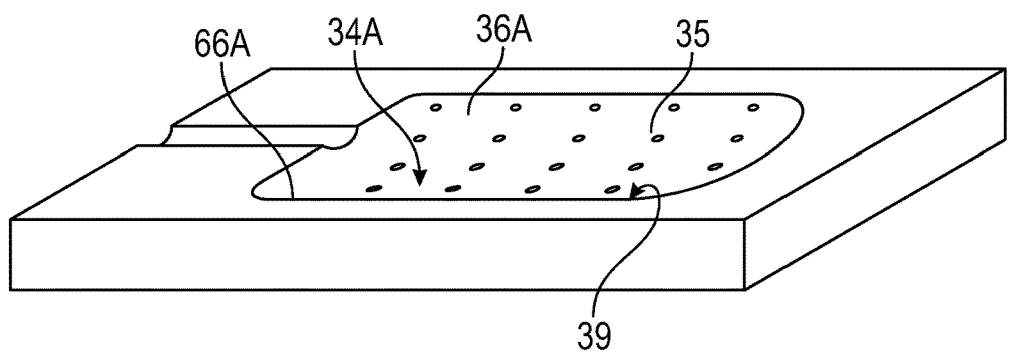
FIG. 5         FIG. 6
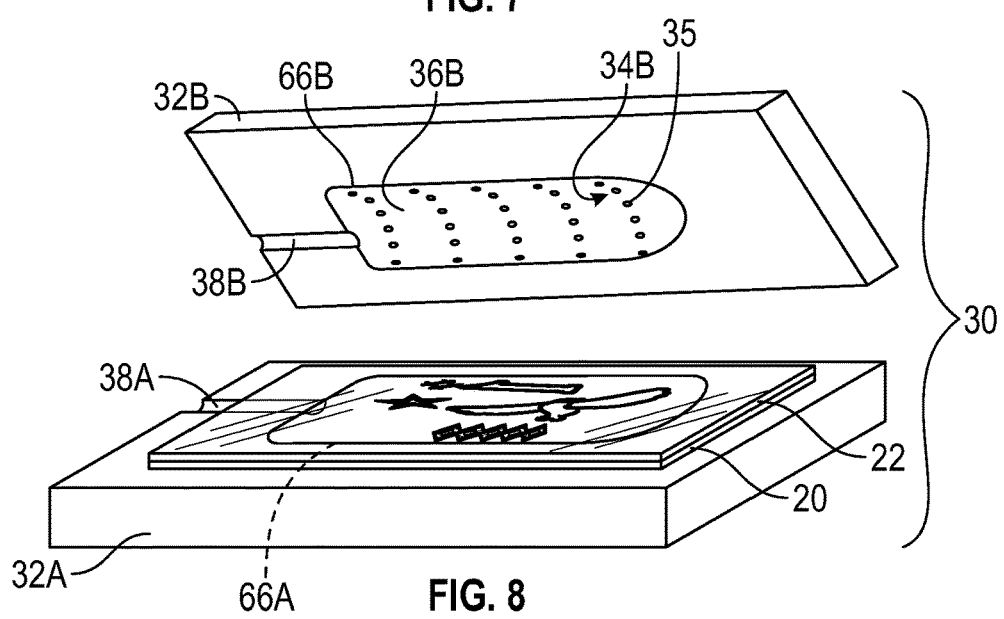
FIG. 7
FIG. 8

METHOD OF MANUFACTURING A BLADDER ELEMENT WITH AN ETCHED FEATURE AND ARTICLE HAVING A BLADDER ELEMENT WITH AN ETCHED FEATURE

CROSS-REFERENCE TO RELATED APPLICATION

This application is a continuation of U.S. application Ser. No. 15/093,095, filed on Apr. 7, 2016, which claims the benefit of U.S. Provisional Application No. 62/144,551 filed Apr. 8, 2015, and both of which are hereby incorporated by reference in their entireties.

TECHNICAL FIELD

The present teachings generally include an article that comprises a polymeric sheet for forming a bladder element with an etched feature on the polymeric sheet, and a method of manufacturing the article.

BACKGROUND

Clothing, an accessory, and/or athletic wear are often a source of expression for the wearer. The clothing, accessory, and/or athletic wear may provide an association with a team, coordinate with another item, or provide the owner or user with an attractive or customized item.

Footwear typically includes a sole configured to be located under a wearer's foot to space the foot away from the ground or floor surface. Footwear sometimes utilizes polyurethane foam or other resilient materials in the sole to provide cushioning.

BRIEF DESCRIPTION OF THE DRAWINGS

FIG. 4 is a schematic illustration in fragmentary cross-sectional view of the article of footwear of FIG. 9 taken at lines 4-4 in FIG. 9.

FIG. 5 is a schematic illustration in fragmentary cross-sectional view of an outer layer of the polymeric sheet shown in FIG. 4 with the etched feature.

FIG. 6 is a schematic illustration in fragmentary cross-sectional view of an alternative embodiment of an outer layer of the polymeric sheet of FIG. 4 with an alternative etched feature.

FIG. 7 is a schematic illustration in perspective view of a first mold half of a mold assembly for the bladder element of FIG. 1.

FIG. 8 is a schematic illustration in exploded perspective view of a mold assembly including the mold half of FIG. 7 with first and second polymeric sheets for the bladder element of FIG. 1 positioned thereon.

DESCRIPTION

Figure 1:
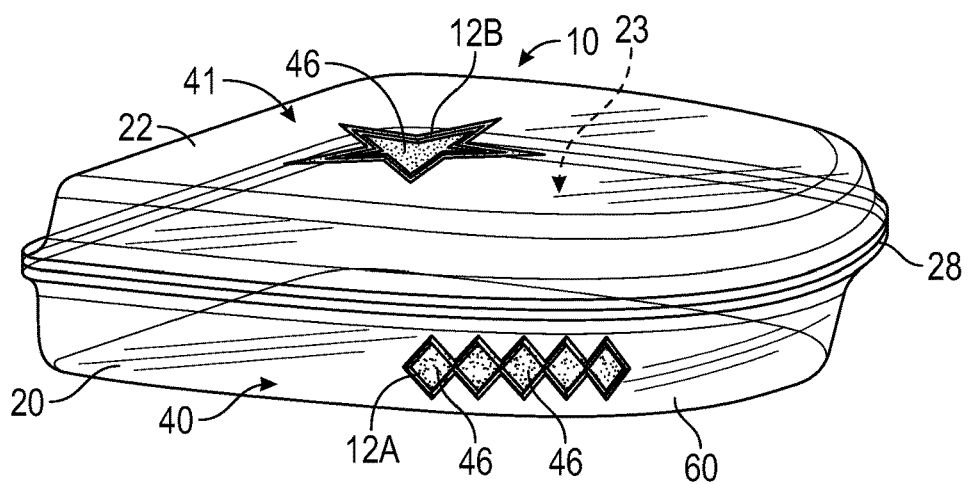
FIG. 1 is a schematic illustration in perspective view of a first embodiment of a bladder element having polymeric sheets with etched features.

A method of manufacturing an article comprises etching an etched feature on a surface of a first polymeric sheet, and forming a fluid-filled bladder element, at least partially from the first polymeric sheet, wherein the fluid-filled bladder element has a sealable internal cavity that retains fluid. The method includes assembling the fluid-filled bladder element in the article so that a first portion of the fluid-filled bladder element having the etched feature is exposed to view, and a second portion of the fluid-filled bladder element is blocked from view by the article.

The article may have an opening, and the etched feature may be aligned with the opening, and exposed to view through the opening. For example, the article may be an article of footwear having a sole assembly and an upper, with the opening in one of the sole assembly and the upper. Assembling the fluid-filled bladder element in the article may comprise securing the fluid-filled bladder element to the sole assembly so that the etched feature is aligned with the opening and exposed to view through the opening. For example, the opening may be in a midsole or an outsole of the sole assembly. In an embodiment, the method may comprise securing an outsole, at least one portion of which is substantially transparent, to the fluid-filled bladder element so that the at least one portion of the outsole that is substantially transparent is aligned with the etched feature, and the etched feature is exposed to view through the at least one portion of the outsole that is substantially transparent.

The method may include disposing the first polymeric sheet in a mold assembly, and conforming the first polymeric sheet to a mold surface of the mold assembly to at least partially form the bladder element. Etching the etched feature in the surface of the first polymeric sheet may be prior to conforming the first polymeric sheet to the mold surface or after the bladder element is formed. The first polymeric sheet may be disposed in the mold assembly so that the surface of the first polymeric sheet with the etched feature is one of an inner surface or an outer surface of the bladder element.

The etching may be by at least one of laser etching or mechanical etching. In some embodiments, the method may include applying a colored medium to the first polymeric sheet, and the etched feature may be etched so that it is adjacent to or on the colored medium. The etched feature may comprise at least one of a protrusion from or a recess in the surface of the bladder element. In one embodiment, a substantially transparent topcoat may be secured to the fluid-filled bladder element over the etched feature to protect the etched feature from damage and abrasion.

Etching of the etched feature may be controlled in various ways to maintain the integrity of the bladder element and the sealed internal cavity. For example, etching the etched feature may be controlled so that the etched feature has a maximum depth into the first polymeric sheet of not more than about one-half of a first thickness of the first polymeric sheet. In some embodiments, the first polymeric sheet comprises a gas barrier polymer. Etching the etched feature may be controlled so that the gas barrier polymer is not compromised by the etching.

The method may further comprise treating the surface of the bladder element to achieve at least one of a predetermined level of opacity, transparency, or luster of the bladder element. This treatment may occur after conforming the first polymeric sheet to the mold surface to at least partially form the bladder element. Treating the surface of the bladder element may be by at least one of heating the surface of the bladder element or applying a softening agent to the surface of the bladder element.

In some embodiments, a first area of the surface of the bladder element may be treated to achieve a first predetermined level of opacity, transparency, or luster. A second area of the surface of the bladder element may have a second predetermined level of opacity, transparency, or luster that is at least ten percent greater than or at least ten percent less than that of the first predetermined level of opacity, transparency, or luster. The etched feature may be in at least one of the first area or the second area of the bladder element.

Conforming the first polymeric sheet to the mold surface may be by any or all of compression forming, vacuum forming, or thermoforming. Additionally, disposing the first polymeric sheet in the mold assembly may be so that the etched feature is at least partially on a curved portion of the bladder element that corresponds to a curved portion of the mold surface.

The method may further comprise inflating the bladder element by filling the sealable internal cavity with a fluid, and then sealing the sealable internal cavity so that the fluid is retained in the sealable internal cavity. In one embodiment, the fluid is a gas at or above ambient pressure. The bladder element may have a gas transmission rate for nitrogen of less than 10 cubic centimeters per square meter per atmosphere per day, or of less than 1 cubic centimeter per square meter per atmosphere per day.

The bladder element may be formed from various polymeric materials enabling fluid retention and the gas transmission rate as described. For example, the polymeric material of the first polymeric sheet used to form the fluid-filled bladder element may comprise a thermoplastic polymeric material. In one embodiment, the thermoplastic polymeric material may be a thermoplastic polyurethane (TPU). In one embodiment, the TPU is present on at least an outer surface of the first polymeric sheet. The first polymeric sheet may comprise a multi-layer polymeric sheet. The multi-layer polymeric sheet may be a laminate membrane that comprises at least a first layer comprising the TPU, and at least a second layer comprising a gas barrier polymer. The gas barrier polymer may comprise an ethylene-vinyl alcohol copolymer. In one embodiment, the at least a first layer consists essentially of the TPU, and the at least a second layer consists essentially of the ethylene-vinyl alcohol copolymer.

The method may include forming a peripheral seam in the bladder element by bonding in the mold assembly. The seam at least partially seals the sealable internal cavity in the bladder element. The etched feature is spaced apart from the seam.

Optionally, in addition to the etched feature on the first polymeric sheet, the mold surface may have an etched area. Conforming the first polymeric sheet to the mold surface may comprise imparting an impression of the etched area onto the surface of the bladder element. Stated differently, when the first polymeric sheet is conformed to the mold surface during forming of the bladder element, an impression of the etched area is imparted onto the surface of the first polymeric sheet. Furthermore, the etched feature may be at least partially aligned with the etched area of the mold assembly during disposing of the first polymeric sheet in the mold assembly so that the impression of the etched area is at least partially on the etched feature. The surface of the bladder element having the impression may be an outer surface. The etched feature may be on one of the outer surface or an inner surface of the bladder element.

The method may further comprise applying a colored medium to the first polymeric sheet. At least one of the etched feature or the impression may be adjacent to or on the colored medium on the first polymeric sheet.

Various articles may be manufactured by the method described herein. For example, the article manufactured may be an article of footwear. In various embodiments, the article of footwear may include in a sole assembly that includes an outsole, a midsole, or a combination of both an outsole and a midsole.

Within the scope of the present teachings, an article comprises a fluid-filled bladder element at least partially formed from a first polymeric sheet that has an etched feature on a surface of the first polymeric sheet. A first portion of the fluid-filled bladder element having the etched feature is exposed to view, and a second portion of the fluid-filled bladder element is blocked from view by the article.

Furthermore, the article may have an opening, with the etched feature aligned with and exposed to view through the opening. In one embodiment of the article, the bladder element has a peripheral seam that at least partially seals the sealable internal cavity. The etched feature is spaced apart from the peripheral seam. For example, the article may be an article of footwear having a sole assembly and an upper, with the opening in one of the sole assembly and the upper. The fluid-filled bladder element is secured to the sole assembly so that the etched feature is aligned with the opening and exposed to view through the opening. For example, the opening may be in a midsole or an outsole of the sole assembly. In an embodiment, an outsole, at least one portion of which is substantially transparent, is secured to the fluid-filled bladder element so that the at least one portion of the outsole that is substantially transparent is aligned with the etched feature, and the etched feature is exposed to view through the at least one portion of the outsole that is substantially transparent.

The bladder element may be manufactured by disposing the first polymeric sheet in a mold assembly, and then conforming the first polymeric sheet to a mold surface of the mold assembly to at least partially form the bladder element with the sealable internal cavity and with the etched feature on the surface of the bladder element. The etched feature may be etched on the surface of the first polymeric sheet by at least one of laser etching or mechanical etching.

The surface of the bladder element may have at least one of a predetermined level of opacity, transparency or luster achieved by treating the surface of the bladder element by at least one of heating or applying a softening agent. A first area of the surface of the bladder element has a first predetermined level of opacity, transparency or luster and a second area of the surface of the bladder element has a second predetermined level of opacity, transparency or luster that is at least ten percent greater than or at least ten percent less than the first predetermined level of opacity, transparency or luster. The etched feature is on at least one of the first area or the second area.

The first polymeric sheet may be conformed to the mold surface by at least one of heating, vacuum forming, or thermoforming the first polymeric sheet. The article may further comprise a colored medium applied to the first polymeric sheet so that the etched feature is adjacent to or on the colored medium on the first polymeric sheet. In one embodiment of the article, the etched feature may be at least partially on a curved portion of the bladder element that corresponds with a curved portion of the mold surface.

As described with respect to the method, the polymeric material of the first polymeric sheet used to form the fluid-filled bladder element of the article may comprise a thermoplastic polymeric material. In one embodiment, the thermoplastic polymeric material may be a thermoplastic polyurethane (TPU). In one embodiment, the TPU is present on at least an outer surface of the first polymeric sheet. The first polymeric sheet may comprise a multi-layer polymeric sheet. The multi-layer polymeric sheet may be a laminate membrane that comprises at least a first layer comprising the TPU, and at least a second layer comprising a gas barrier polymer. The gas barrier polymer may comprise an ethylene-vinyl alcohol copolymer. In one embodiment, the at least a first layer consists essentially of the TPU, and the at least a second layer consists essentially of the ethylene-vinyl alcohol copolymer. Additionally, in one embodiment, the bladder element may have a gas transmission rate for nitrogen of less than 10 cubic centimeters per square meter per atmosphere per day, or of less than 1 cubic centimeter per square meter per atmosphere per day. The sealable internal cavity may be filled with a gas at or above ambient pressure.

In various embodiments, the etched feature may comprise at least one of a protrusion from or a recess in the surface of the bladder element. For example, the article may include the first polymeric sheet having a first thickness, with the etched feature having a maximum depth into the first polymeric sheet of not more than about one-half of the first thickness. In an embodiment in which the first polymeric sheet comprises a gas barrier polymer, a maximum depth of the etched feature in the first polymeric sheet is controlled so that the gas barrier polymer is not compromised. Additionally, a substantially transparent topcoat may be secured to the fluid-filled bladder element over the etched feature.

In one embodiment, the surface of the bladder element has an impression imparted thereon when the first polymeric sheet is conformed to the mold surface of the mold assembly. The mold surface has an etched area, and the impression is of the etched area. The etched feature may at least partially align with the impression. The surface of the bladder element having the impression may be an outer surface, and the etched feature may be on one of the outer surface or an inner surface of the bladder element. The article may include a colored medium applied to the first polymeric sheet. At least one of the etched feature or the impression may be adjacent to or on the colored medium on the first polymeric sheet.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Referring to the drawings, wherein like reference numbers refer to like components throughout the several views, FIG. 1 shows a fluid-filled bladder element 10 that has an etched feature 12A etched thereon. As further explained herein, at least a portion of the fluid-filled bladder element 10 is substantially transparent, and the etched feature 12A can be viewed from an exterior of the fluid-filled bladder element 10 when the fluid-filled bladder element is assembled in an article, such as the article of footwear 18 of FIG. 9. In the embodiment shown, the entire bladder element 10 is substantially transparent prior to application of the colored medium 46. Optionally, as further described herein, a colored medium 46 is aligned with and is adjacent to or on the etched feature 12A. The colored medium 46 can be ink or paint, and may include reflective particles 48, as shown in the close-up view of FIG. 2. Optionally, additional etched features can be etched on the first and second polymer sheets 20, 22. For example, etched feature 12B, shown in FIG. 1, is etched on the second polymeric sheet 22, and etched feature 12C is etched on the first polymeric sheet 20, as shown in FIG. 3. A colored medium 46 is also shown applied to the second polymeric sheet 20 to align with the etched feature 12B. It is to be understood that the colored medium 46 could be of different colors or materials at the different areas of application on the first and second polymeric sheets 20, 22.

The bladder element 10 defines a sealable internal cavity 23. As explained herein, the materials of the first polymeric sheet 20 and the second polymeric sheet 22, as well as the construction of the bladder element 10 are configured so that the bladder element 10 is capable of retaining fluid in the sealable internal cavity 23 when the sealable internal cavity 23 is sealed.

As used herein, a "fluid" includes a gas, including air, an inert gas such as nitrogen, or another gas. Accordingly, "fluid-filled" includes "gas-filled". As used herein, a component is "substantially transparent" if it has a luminous transmittance (i.e., a percentage of incident light that is transmitted) of at least 80 percent and haze (i.e., percentage of transmitted light that is scattered) of not more than 56 percent. The various materials used for the bladder element 10, and other embodiments of bladder elements discussed herein, may be substantially transparent. Those skilled in the art will readily understand a variety of methods to determine luminous transmittance and haze of an object, such as the bladder element 10. For example, the luminous transmittance and haze of the bladder element 10 can be determined according to American Society for Testing and Materials (ASTM) Standard D1003-00, Standard Test Method for Haze and Luminous Transmittance of Transparent Plastics. Additionally, in some embodiments, the bladder element 10 may have a tinted color.

Figure 9:
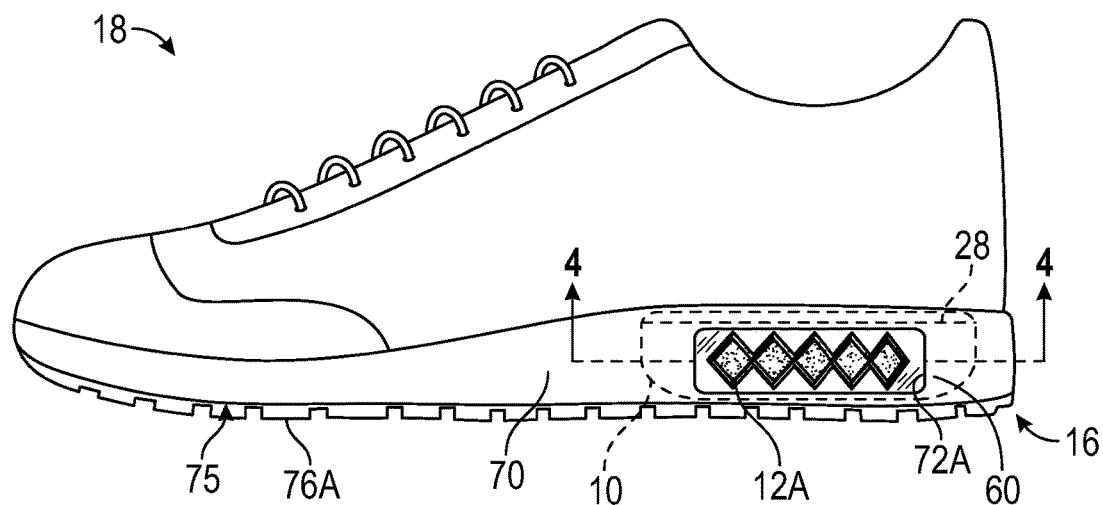
FIG. 9 is a schematic side view illustration of an article of footwear having a sole assembly with the bladder element of FIG. 1 secured to the sole assembly.

The bladder element 10 with etched features 12A, 12B, 12C are included in a sole assembly 16 of an article of footwear 18. As shown in FIG. 9, the article of footwear 18 is an athletic shoe, and the bladder element 10 is a cushioning element. In other embodiments, the sole assembly 16 could be for an article of footwear that is a dress shoe, a work shoe, a sandal, a slipper, a boot, or any other category of footwear. Alternatively, the fluid-filled bladder element 10 could be used as a cushioning element in another article, such as but not limited to a shoulder strap, a backpack, a shoulder pad, a glove, an elbow pad, a knee pad, a shin guard, or other apparel, or a sports ball.

As shown in FIG. 1, the bladder element 10 is formed from the first polymeric sheet 20, and the second polymeric sheet 22 secured to one another to define an internal fluid-filled cavity 23 that sealingly retains a fluid such as gas, as described herein. The second etched feature 12B is etched on the second polymeric sheet 22. In the embodiment shown, the second etched feature 12B is a star shape.

The first etched feature 12A and the third etched feature 12C are etched on the outer surface 40 of the first polymeric sheet 20. When the bladder element 10 is formed, the etched feature 12C is on a bottom surface 53, which is part of the outer surface 40. In the embodiment shown, the third etched feature 12C includes a number and a pictorial representation of a bird. For example, the third etched feature 12C may be a player number and a team logo. As shown in FIGS. 3 and 4, although the second etched feature 12B is on the second polymeric sheet 22, the second etched feature 12B can be viewed from an exterior of the bladder element 10 through the first polymeric sheet 20. In another embodiment, the bladder element 10 may be formed from a single polymeric sheet. The etched features 12A, 12B, 12C can be etched in sheets 20, 22 prior to forming or after forming the bladder element 10.

The fluid-filled bladder element 10 can be formed from a variety of polymeric materials. In an embodiment shown and described at least with respect to FIGS. 1-3, the bladder element 10 can be formed from any of various polymeric materials that can retain a fluid at a predetermined pressure, including a fluid that is a gas, such as air, nitrogen, or another gas. For example, the bladder element 10 can be a thermoplastic polymeric material. The bladder element 10 can be a urethane, polyurethane, polyester, polyester polyurethane, and/or polyether polyurethane. Moreover, the bladder element 10 can be formed of layers of different materials. FIG. 4, which is a close-up fragmentary cross-sectional portion of the bladder element 10 in an article of footwear 18 taken at lines 4-4 in FIG. 9, shows that the first polymeric sheet 20 is a laminate membrane formed from thin films having one or more first layers 24 that comprise thermoplastic polyurethane layers 24 and that alternate with one or more second layers 26, also referred to herein as barrier layers, gas barrier polymers, or gas barrier layers, that comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The second polymeric sheet 22 may be formed from the same materials shown and described in FIG. 4 with respect to the first polymeric sheet 20. The first layer 24 may be arranged to form an outer surface of the first polymeric sheet 20. That is, the outermost first layer 24 shown in FIG. 4 may be a portion of the outer surface 40 of the bladder element 10. The bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier polymer material such as second layers 26 and an elastomeric material such as first layers 24, as disclosed in U.S. Pat. Nos. 6,082,025 and 6,127,026 to Bonk et al. which are incorporated by reference in their entireties. Additional suitable materials for the bladder element 10 are disclosed in U.S. Pat. Nos. 4,183,156 and 4,219,945 to Rudy which are incorporated by reference in their entireties. Further suitable materials for the bladder element 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 10, engineering properties such as tensile strength, stretch properties, fatigue characteristics, dynamic modulus, and loss tangent can be considered. The thicknesses of the first and second polymeric sheets 20, 22 of materials used to form the bladder element 10 can be selected to provide these characteristics. For example, in various embodiments, the bladder element 10 may have a Shore A hardness of about 20 to about 100 when inflated.

As further explained herein, the first and second polymeric sheets 20, 22 used to form the bladder element 10 may be treated or processed, and/or have properties specifically selected to enable the etched features 12A, 12B, and 12C to be lasting and aesthetically pleasing while protecting the ability of the bladder element 10 to sealingly retain the fluid. For example, the sealable internal cavity 23 may be filled with a gas at or above ambient pressure.

In various embodiments, the etched feature 12A may comprise at least one of a protrusion from or a recess in the surface of the bladder element 10. For example, FIG. 5 shows a series of recesses 33A arranged to form the diamond pattern of the etched feature 12A. The recesses 33A are generally triangular grooves in cross section, as shown in FIG. 5, and may be made by removing some of the material of the outermost layer 24 of first polymeric sheet 20 during the etching process. FIG. 6 shows an alternative etching pattern to create an alternative etched feature 12AA that can be used in place of etched feature 12A. The etched feature 12AA forms the diamond pattern by a series of protrusions 33B that are arranged by displacing some of the material of the outermost layer 26 from recesses 33C to protrusions 33B during the etching process.

As shown in FIG. 4, the first polymeric sheet 20 has a first thickness T1. In an embodiment in which the first polymeric sheet 20 comprises a gas barrier polymer, such as in an embodiment in which the second layers 26 are a gas barrier polymer, a maximum depth of the etched feature in the first polymeric sheet is controlled so that the gas barrier polymer of layers 26 is not compromised. A maximum depth D into the first polymeric sheet 20 of the etched feature 12A is much less than a thickness T1 of one of the second layers 26. The maximum depth D could range up to about one-half of the thickness T1 of the first polymeric sheet 20, as the innermost layer 26A of the gas barrier layers 26 would still be intact, enabling a desired maximum gas transmission rate. For example, the bladder element 10 may have a gas transmission rate for nitrogen of less than 10 cubic centimeters per square meter per atmosphere per day, or of less than 1 cubic centimeter per square meter per atmosphere per day. In various embodiments, by way of non-limiting example, the depth of the etched feature 12A, 12B, and/or 12C may be from 73 micrometers to 270 micrometers.

In the embodiment shown in FIG. 1, the etched feature 12A is a diamond pattern. As indicated in the close-up view in FIG. 2, the colored medium 46 is an ink as a base and has reflective particles 48. The reflective particles 48 allow for light to be cast back towards its source. The reflective particles 48 may also allow light to be scattered. In such embodiments, this provides a safety feature for low-light or full-light environments. The reflective particles 48 can be metal flakes or may include a phosphorescent material so that the reflective particles are a "glow-in-the-dark" material. In embodiments with reflective particles 48, a curved portion 60 of the inflated bladder element 10, discussed with respect to FIG. 4, facilitates reflecting of the light by the reflective particles 48. For example, during a normal gait, a foot on which the article of footwear 18 is worn is repeatedly lifted and planted. The motion of the normal gait creates an additional "flash" of reflected light from the reflective particles 48 and makes the article of footwear 18 more noticeable. The etched feature 12B is also shown aligned with, and adjacent to the colored medium 46.

In an embodiment in which the colored medium 46 is an ink, applying the colored medium 46 to the bladder element 10 may be by printing the ink on the first polymeric sheet 20 prior to or after etching the first etched feature 12A and the third etched feature 12C, and printing the ink on the second polymeric sheet 22 prior to or after etching the second etched feature 12B. Exemplary printing techniques include direct and indirect printing techniques.

Figure 14:
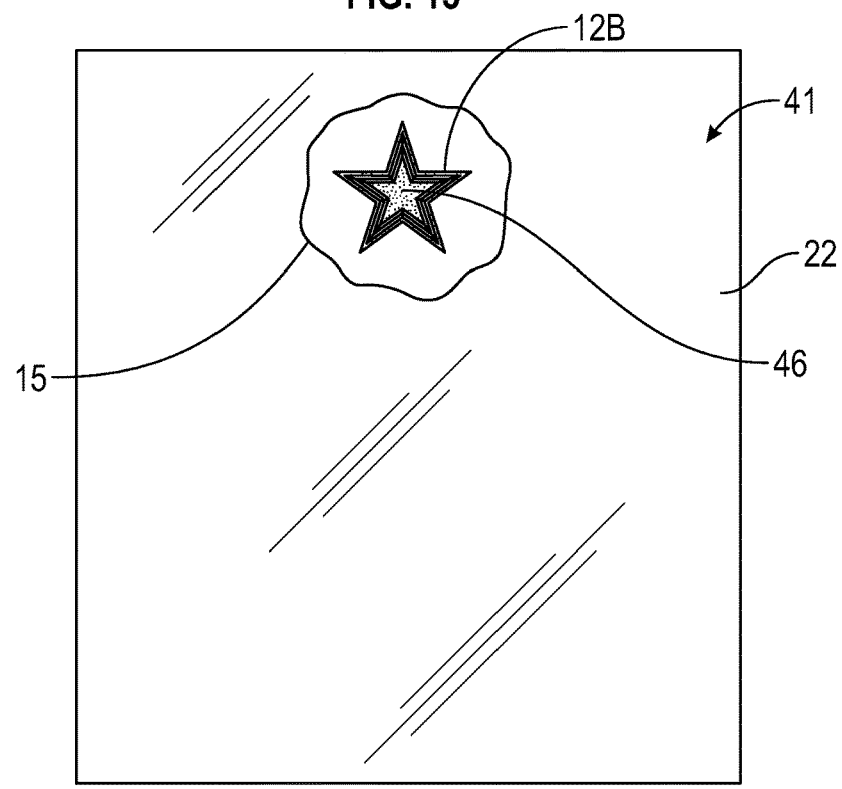
FIG. 14 is a schematic illustration in plan view of a second polymeric sheet used to form the bladder element of FIG. 1, showing another etched feature.

In certain embodiments, a protective coating layer 15, shown in FIG. 14 with respect to etched feature 12B, also referred to as a topcoat or barrier, can be placed on and secured to the bladder element 10 over one or more of the etched features 12A, 12B, 12C to protect the etched features 12A, 12B, 12C. Exemplary materials for a coating layer include polymers or prepolymers such as polyurethane, polytetrafluoroethylene, polypropylene, polycarbonate, and the like, as non-limiting examples.

The bladder element 10 may be manufactured by disposing the first polymeric sheet 20 in a mold assembly 30, shown in FIG. 8, and then conforming the first polymeric sheet 20 to a mold surface 34A of the mold assembly to at least partially form the bladder element 10 with the sealable internal cavity 23 and with the etched features 12A, 12C on the outer surface 40 of the bladder element 10. The etched features 12A, 12C may be etched on the outer surface 40 of the first polymeric sheet 20 by at least one of laser etching or mechanical etching. Similarly, the etched feature 12B may be etched on the outer surface 41 of the second polymeric sheet 22 by any of the same etching methods.

Laser etching can be carried out with a laser etching machine that uses a computer controlled laser. The laser moves according to a predetermined pattern and at predetermined depths pursuant to a stored software algorithm to create the etched features 12A, 12B, and 12C. Mechanical etching can be accomplished using a tool head that contacts the surfaces 40, 41 of the first and second polymeric sheets 20, 22 to etch the etched features 12A, 12B, and 12C. A mechanical etching machine can be used so that the tool head is also computer controlled to move according to a predetermined pattern and at predetermined depths pursuant to a stored software algorithm to create the etched features 12A, 12B, and 12C.

Figure 16:
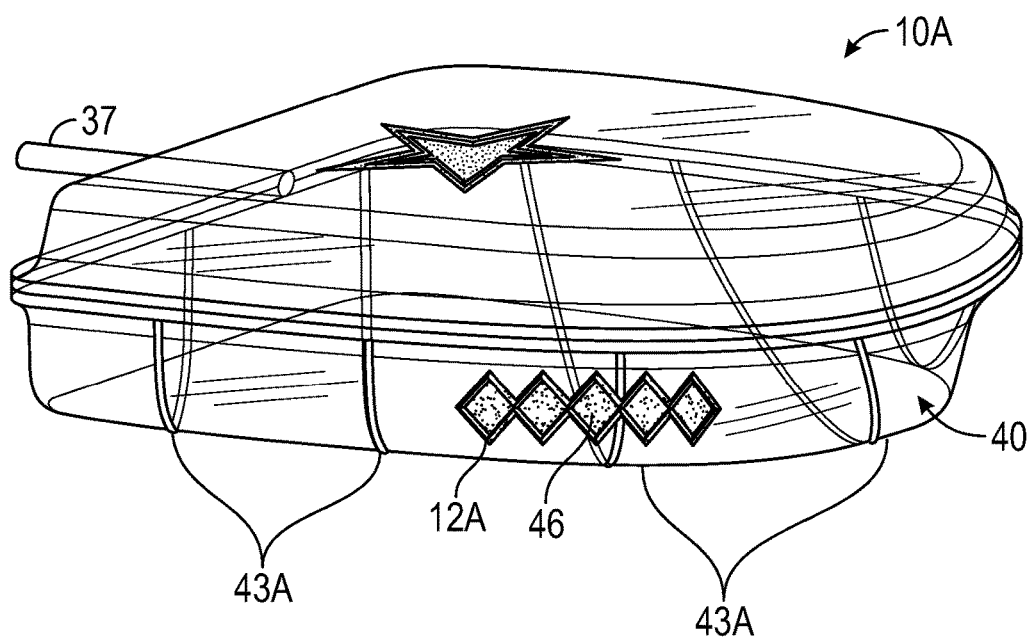
FIG. 16 is a schematic illustration in perspective view of an alternative embodiment of a bladder element having polymeric sheets with etched features and having an impression of the etched area of the alternative first mold half of FIG. 15.

With reference to FIG. 1, the first polymeric sheet 20 is bonded to the second polymeric sheet 22 to form a peripheral seam 28 around a periphery of the bladder element 10. The seam 28 seals the internal cavity 23 of the bladder element 10, assuming a fill tube or other filling mechanism formed with the bladder element 10 is plugged. An example bladder element 10A formed with a fill tube 37 is shown in FIG. 16. The fill tube 37 is subsequently trimmed from the bladder element 10A after being used to inflate the internal cavity 23 and after being plugged. The bladder element 10 is also initially formed with a similar fill tube as fill tube 37, and that is plugged and trimmed after inflation of the bladder element 10. The seam 28 may also help the bladder element 10 retain its shape. The first and second polymeric sheets 20, 22 can be bonded to one another by forming in the mold assembly 30 as shown in FIG. 8. The mold assembly 30 includes a first mold half 32A and a second mold half 32B. The first mold half 32A has a mold cavity portion 36A with a mold surface 34A, shown best in FIG. 7. The second mold half 32B has a mold cavity portion 36B with a mold surface 34B.

Figure 13:
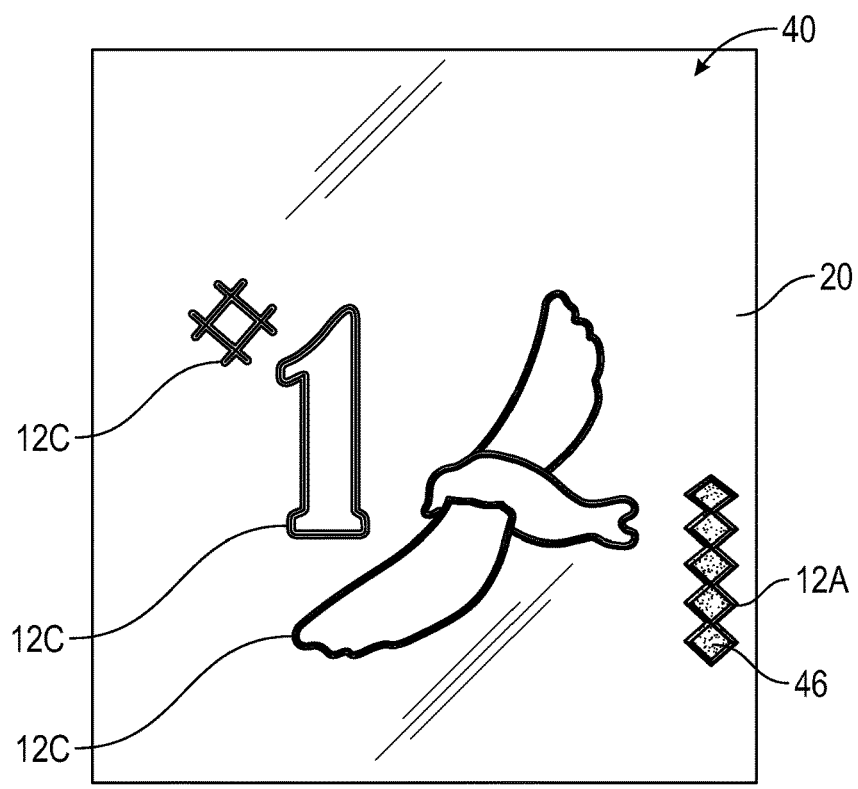
FIG. 13 is a schematic illustration in plan view of a first polymeric sheet used to form the bladder element of FIG. 1, showing etched features.

FIG. 13 shows an embodiment in which the etched features 12A and 12C are etched on the outer surface 40 of the first polymeric sheet 20 prior to formation of the bladder element 10. FIG. 14 shows an embodiment in which the etched feature 12B is etched on the outer surface 41 of the second polymeric sheet 22 prior to formation of the bladder element 10. Additionally, the colored medium 46 is applied, and the topcoat 15 is applied over the colored medium 46 and etched feature 12B. Alternatively, the etched features 12A, 12B, 12C can instead be etched after formation and inflation of the bladder element 10.

Referring to FIG. 8, to form the bladder element 10 in the mold assembly 30, either before or after the etched features 12A, 12B, 12C are etched on the first and second polymeric sheets 20, 22, the first polymeric sheet 20 is laid on the first mold half 32A, across the mold cavity portion 36A shown best in FIG. 7. The second polymeric sheet 22 is then placed on the first polymeric sheet 20. Both the first and the second polymeric sheets 20, 22 are in their original, generally flat form when initially placed on the first mold half 32A. After the first and second polymeric sheets 20, 22 are placed on the first mold half 32A, the mold assembly 30 is closed. A forming process is then used to shape the first and second polymeric sheets 20, 22 to the mold halves 32A, 32B, such as by the use of temperature and pressure control. For example, the forming process may include any or all of thermoforming, vacuum forming, compression forming, or radio frequency (RF) welding. Vacuum ports 35 are shown extending through the mold halves 32A, 32B, and a vacuum may be applied through the ports 35 to pull the first and second polymeric sheets 20, 22 against the mold surfaces 34A, 34B in the mold halves 32A, 32B. The first and second polymeric sheets 20, 22 may be heated by the mold assembly 30 during the forming process. Additionally, a fill tube like fill tube 37 of FIG. 16 may be formed by the first and second polymeric sheets 20, 22 at the recesses 38A, 38B in the mold halves 32A, 32B shown in FIG. 8. The recesses 38A, 38B mate when the mold assembly 30 is closed. The portion of the first and second polymeric sheets 20, 22 surrounding the mold cavity portions 36A, 36B are bonded to one another by any or all of thermoforming, radio frequency welding, or compression forming through pressure applied by the mold halves 32A, 32B or by a separate machine after removal from the mold halves 32A, 32B.

After the first and second polymeric sheets 20, 22 are formed to the contours of the mold assembly 30 in the mold cavity portions 36A, 36B and, if heated, sufficiently cooled, the mold halves 32A, 32B are then separated, and excess material of the first and second polymeric sheets 20, 22 around the periphery of the seam 28 is trimmed. The fill tube formed at the recesses 38A, 38B may be used to inflate the bladder element 10 with gas at or above ambient pressure, and then the fill tube may be plugged and trimmed so that the bladder element 10 is in its final, formed state.

As best shown in FIGS. 4 and 9, at least the etched feature 12A is on a curved portion 60 of the outer surface 40 of the bladder element 10. The etched features 12A, 12B, 12C are each spaced from the seam 28 on the formed bladder element 10 due to their initial placement in the mold assembly 30 away from a perimeter 66A, 66B of the mold cavity portions 36A, 36B. The etched features 12A, 12B, 12C are etched on the first and second polymeric sheets 20, 22 so that they are also spaced from the seam 28.

The surface 40 of the bladder element 10 may have at least one of a predetermined level of opacity, transparency or luster achieved by treating the surface 40 of the bladder element 10 by at least one of heating or applying a softening agent. For example, with reference to FIG. 3, a first area 61 of the outer surface 40 of the bladder element 10 is the area both including the etched bird shape of the etched feature 12C and within the etched bird shape. The first area 61 has a first predetermined level of opacity, transparency or luster. A second area 63 of the surface 40 of the bladder element 10 is the area surrounding and not within the etched feature 12C, and has a second predetermined level of opacity, transparency or luster that is at least ten percent greater than or at least ten percent less than the first predetermined level of opacity, transparency or luster. The etched feature 12C is on the first area 61.

The second area 63 may achieve a predetermined level of opacity, transparency, or luster by heating the entire bladder element 10, such as after formation and/or while in the mold assembly 30. The first area 61 may be made more lustrous than the second area 63 such as by applying a softening agent only to the first area 61.

With reference to FIG. 9, the bladder element 10 can be secured in the sole assembly 16 such as by bonding to a member of the article of footwear 18, such as to a midsole 70 of the sole assembly 16. For example, the bladder element 10 can be bonded with adhesive to the formed midsole 70. Alternatively, the bladder element 10 can be placed in a midsole mold assembly (not shown), and the midsole 70 may be formed around the bladder element 10, such as by injecting foam into the midsole mold assembly. In still other embodiments, the bladder element 10 is secured to the sole assembly 16 by an interference fit. In some embodiments, the bladder element 10 serves as at least a portion of a midsole, an outsole, or both. In all such embodiments, because the etched features 12A, 12B, 12C are spaced from the seam 28, the etched features 12A, 12B, 12C can be aligned with and exposed to view through the openings in the sole assembly 16 and/or a footwear upper extending over the sole assembly, such as represented by an insole or sockliner 73 as described herein, while the seam 28 can be covered by and blocked from view by the article of footwear 18. For example, as shown in FIGS. 4 and 9, the midsole 70 is formed with an opening 72A. The etched feature 12A is positioned at the opening 72A so that it is at the exterior of the article of footwear 18 and exposed to view through the opening 72A, while the peripheral seam 28 is covered by and blocked from view by the article of footwear 18, and more specifically by the midsole 70 (i.e., is not exposed at the opening 72A). Stated differently, a first portion of the bladder element 10 including the etched feature 12A is aligned with the opening 72A and exposed to view through the opening 72A (i.e., such as from a viewpoint of a side view as in FIG. 5). A second portion of the bladder element (i.e., the portion indicated with hidden lines in FIG. 5) is covered by and blocked from view by the midsole 70.

Figure 10:
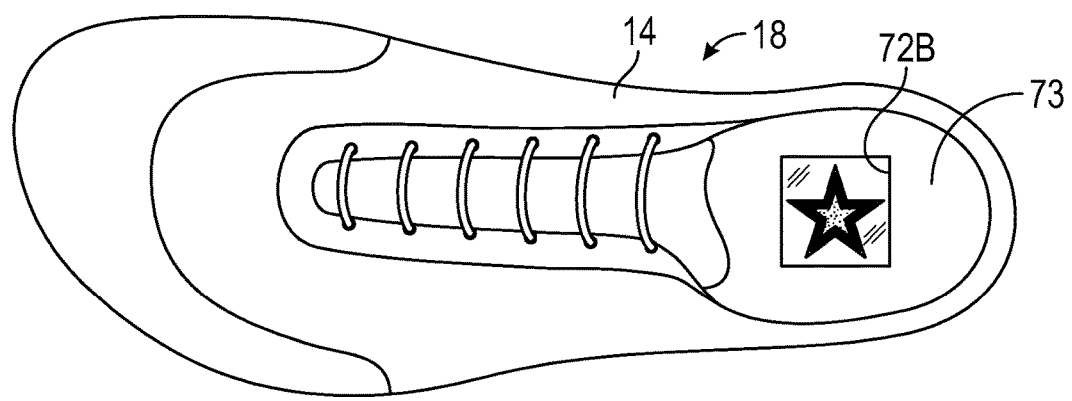
FIG. 10 is a schematic top view illustration of the article of footwear of FIG. 9.

In another example, the member of the article of footwear 18 is an upper 14 that includes a sockliner 73, as shown in FIG. 10. The sockliner 73 also has an opening 72B and the bladder element 10 is secured to the sole assembly 16 so that the sole assembly 16 and the sockliner 73 do not cover the etched feature 12B, and a first portion of the bladder element 10 with the etched feature 12B is exposed to view through the opening 72B, with the etched feature 12B aligned with the opening 72B. A second portion of the bladder element 10, including the peripheral seam 28, is not exposed at the opening 72B, but is covered by and blocked from view at least by the sockliner 73 (i.e., from the viewpoint of FIG. 610).

Figure 11:
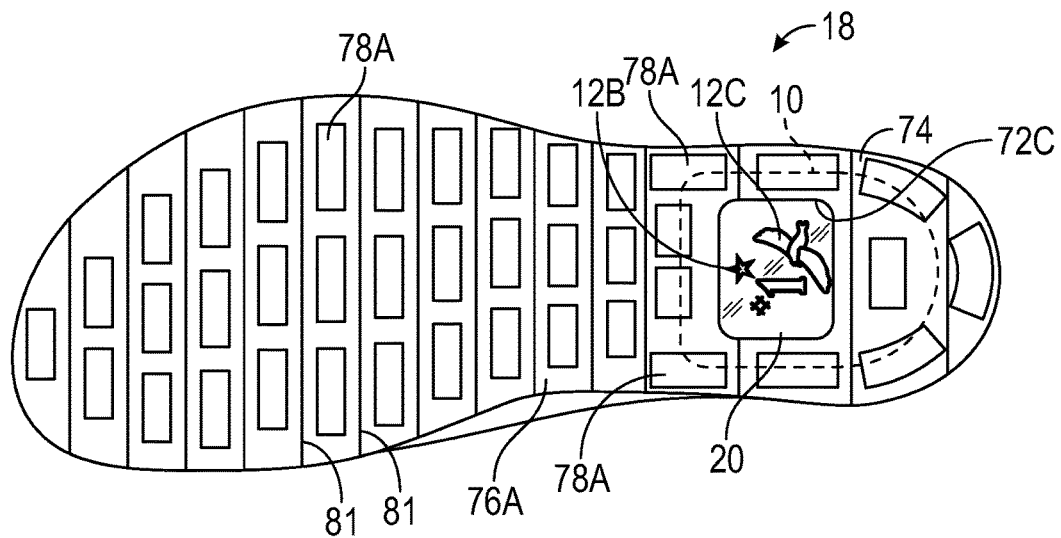
FIG. 11 is a schematic bottom view illustration of the article of footwear of FIG. 9 having a first embodiment of an outsole.

As is apparent in FIG. 11, the sole assembly 16 does not cover at least the etched feature 12C. The sole assembly 16 includes an outsole 76A secured to a lower surface 75 of the midsole 70 as shown in FIG. 9. In one embodiment, the outsole 76A has an opening 72C that is aligned with the etched feature 12C so that the etched feature 12C is exposed to view through the opening 72C at the exterior of the article of footwear 18 and may be viewed from a viewpoint looking at the bottom of the article of footwear 18, such as when a wearer of the article of footwear 18 lifts a heel portion 74 of the article of footwear 18. A second portion of the bladder element 10, represented by hidden lines in FIG. 9, is covered by the outsole 76A and blocked from view by the outsole 76A.

The outsole 76A is shown with tread elements 78A having bottom surfaces that form a ground contact surface of the article of footwear 18. The tread elements 78A can have various alternative shapes and can be arranged in various alternative arrangements. The outsole 76A shows grooves 81 formed in the outsole 76A.

Figure 12:
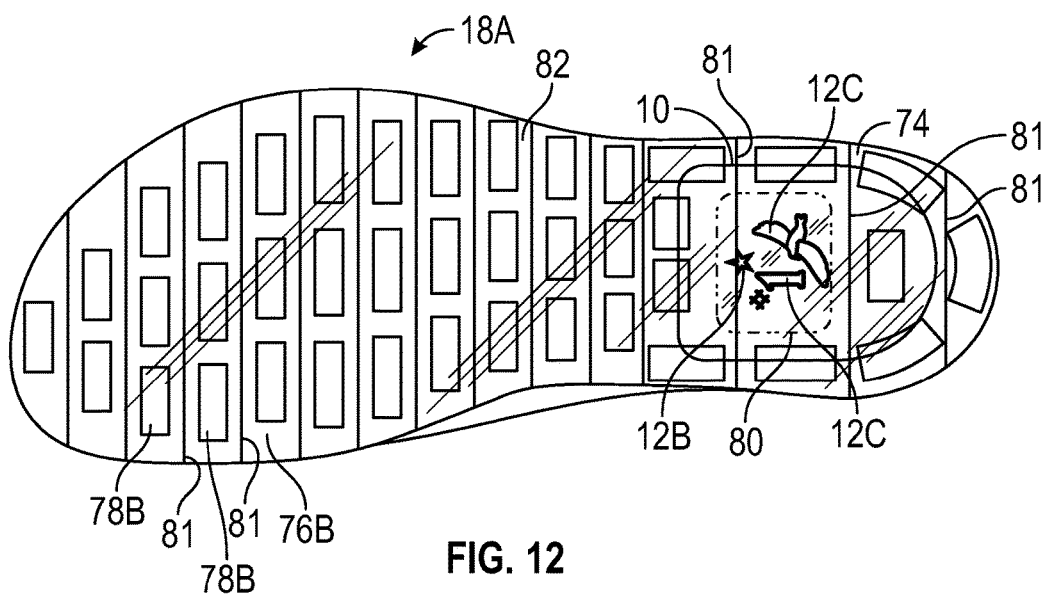
FIG. 12 is a schematic bottom view illustration of the article of footwear of FIG. 9 having an alternative embodiment of an outsole.

FIG. 12 shows an alternative embodiment of an outsole 76B secured to the midsole 70 of FIG. 9 and to the bladder element 10. The outsole 76B has at least a portion 80, bounded by phantom lines, that is substantially transparent. The substantially transparent portion 80 is aligned with the etched feature 12C so that the etched feature 12C is exposed to view at an exterior of an article of footwear 18A, and may be viewed through the portion 80 of the outsole 76B that is substantially transparent, such as when a wearer lifts the heel portion 74 of the article of footwear 18A. A remaining portion 82 of the outsole 76B, not bounded by the phantom lines, can also be substantially transparent. In the embodiment shown, the entire outsole 76B is substantially transparent. Alternatively, the remaining portion 82 could be opaque or not substantially transparent. The outsole 76B shows grooves 81 formed in the outsole 76B and a different arrangement of tread elements 78B. The article of footwear 18A has a different outsole 76B than the article of footwear 18, but is otherwise the same as the article of footwear 18.

Figure 15:
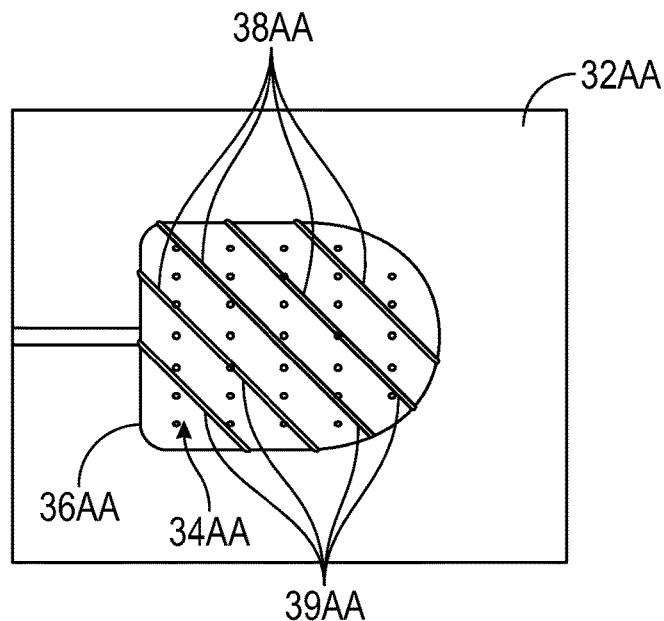
FIG. 15 is a schematic illustration in plan view of an alternative first mold half for the mold assembly of FIG. 8, having an etched area.

FIG. 15 shows an alternative first mold half 32AA that may be used instead of the first mold half 32A in the mold assembly 30. The first mold half 32AA has a cavity portion 36AA with a mold surface 34AA. The mold surface 34AA has an etched area 38AA, which in the embodiment shown is a series of diagonal, etched grooves 39AA. When the first polymeric sheet 20 is conformed to the mold surface 34AA during forming of the bladder element 10, an impression 43A of the etched area 38AA is imparted onto the outer surface 40 of the bladder element 10. The material of the first polymeric sheet 20 fills the etched grooves 39AA of the mold half 32AA during forming of the bladder element 10, creating the impression 43A. The etched feature 12A on the first polymeric sheet 20 at least partially aligns with the impression 43A, as shown in FIG. 16. Although the etched feature 12A is shown in the outer surface 40, the etched feature 12A may instead be on an inner surface of the bladder element 10 by etching the etched feature 12A on an opposite side of the first polymeric sheet 20 prior to formation of the bladder element 10. FIG. 16 also illustrates that the etched feature 12A and/or the impression 43A can be configured in one embodiment to be adjacent to or on the colored medium 46 on the first polymeric sheet 20.

Figure 2:
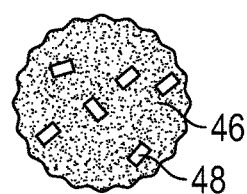
FIG. 2 is a schematic illustration in fragmentary view of a portion of colored medium applied to one of the polymeric sheets of FIG. 1.
Figure 3:
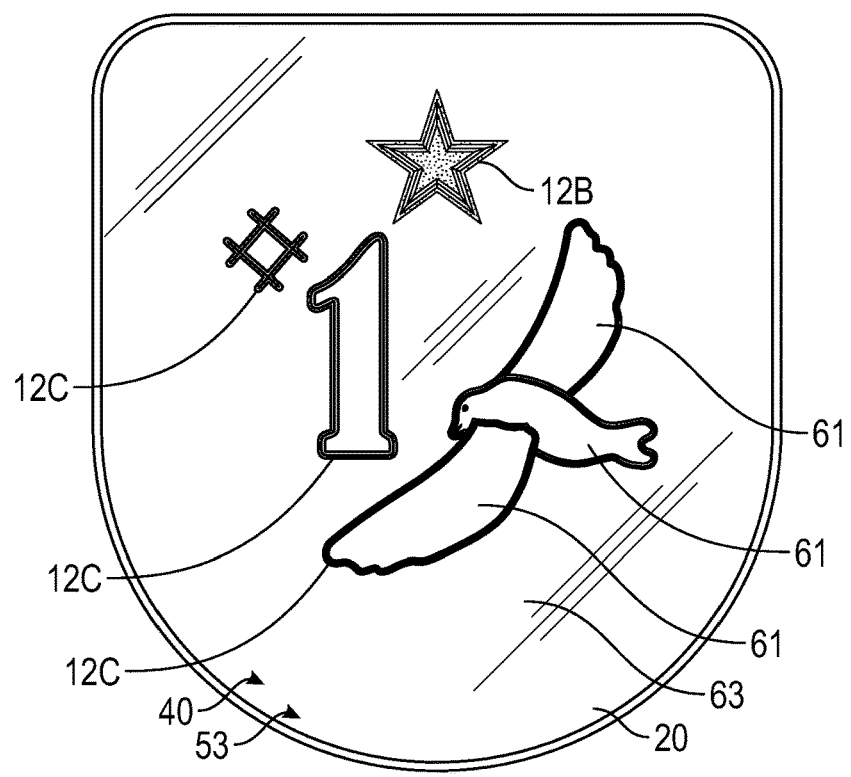
FIG. 3 is a schematic illustration in bottom view of the bladder element of FIG. 1 showing another etched feature.
Figure 17:
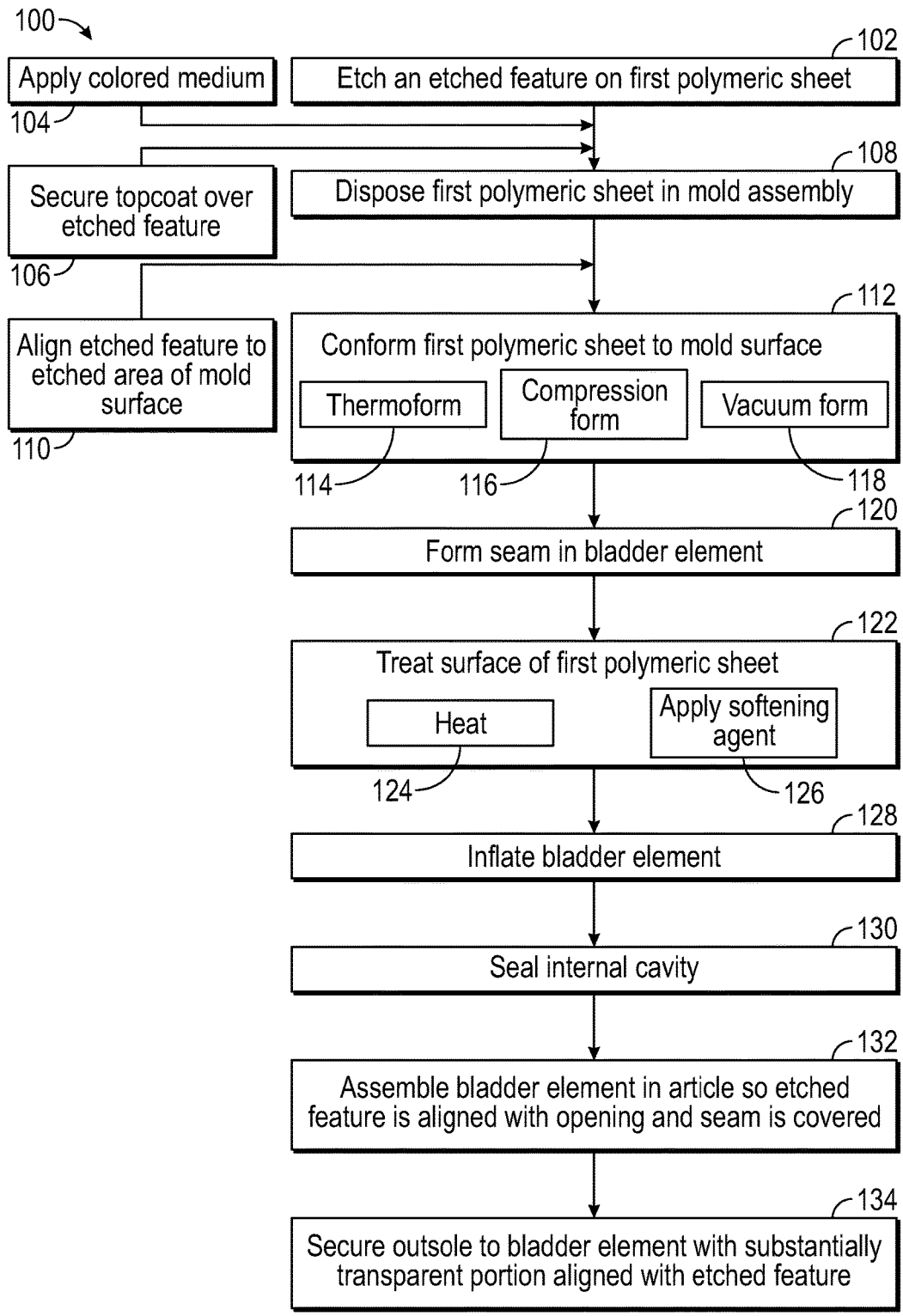
FIG. 17 is a flow diagram illustrating a method of manufacturing an article such as the article of footwear of FIG. 9.

Referring to FIG. 17, a method 100 of manufacturing an article, such as the article of footwear 18, is described with respect to the bladder element 10 of FIGS. 1-3 and the article of footwear 18 of FIG. 9. The method 100 may begin with step 102, etching an etched feature 12A on the surface 40 of the first polymeric sheet 20 by at least one of laser etching or mechanical etching. For purposes of discussion, the method 100 is discussed with respect to etched feature 12A. In some embodiments, the method 100 may include step 104, applying a colored medium 46 to the first polymeric sheet 20, and the etched feature 12A may be etched to be adjacent to or on the colored medium 46 on the first polymeric sheet 20. In one embodiment, a substantially transparent topcoat 15 may be secured to the bladder element 10 over the etched feature 12A in step 106, such as to protect the etched feature from abrasion. In some embodiments of the method 100, the first and second polymeric sheets 20, 22 may be obtained with the etched features 12A, 12B and 12C already etched thereon, in which case step 102 is not performed.

The method 100 further comprises step 108, disposing a first polymeric sheet 20 in a mold assembly 30. The first polymeric sheet 20 may be disposed in the mold assembly 30 so that the surface 40 of the first polymeric sheet 20 with the etched feature 12A will be on one of an inner surface or an outer surface of the bladder element 10. In the embodiment shown, the surface 40 is an outer surface of the bladder element 10. In an embodiment in which the mold assembly 30 includes a mold surface 34A with an etched area 38AA and the etched feature 12A is etched in the first polymeric sheet 20 before formation of the bladder element 10, the method 100 also includes step 110, aligning the etched feature 12A with the etched area 38AA so that the impression 43A of the etched area 38AA will be adjacent to or on the etched feature 12A, as shown in FIGS. 15 and 16. Still further, in an embodiment in which etching occurs after the bladder element 10 is formed and inflated, steps 102, 104, and 106 occur after step 130, and step 110 does not occur.

The method 100 further comprises step 112, conforming the first polymeric sheet 20 to the mold surface 34A of the mold assembly 30 to at least partially form a bladder element 10 with a sealable internal cavity 23, and with the etched feature 12A on the surface 40 of the bladder element 10. The first polymeric sheet 20 with the etched feature 12A is configured so that the bladder element 10 retains fluid in the sealable internal cavity 23 when the sealable internal cavity 23 is sealed. Conforming the first polymeric sheet 20 to the mold surface 34A may be by any or all of thermoforming in sub-step 114, compression forming in sub-step 116, or vacuum forming in sub-step 118.

The method 100 may further comprise step 120, forming a peripheral seam 28 in the bladder element 10 that seals the internal cavity 23. Forming the seam 28 in step 120 may be by compression forming, such as during step 112 while the sheet 20 is conformed to the mold surface 34A, by radio frequency (RF) welding, and/or by the use of adhesives. Forming the bladder element 10 in steps 112 and 120 is accomplished so that the first and second polymeric sheets 20, 22 are bonded at the seam 28, the etched feature 12A is on a curved portion 60 of the bladder element 10 spaced from the seam 28, and the etched features 12B and 12C are also spaced from the seam 28. Additionally, disposing the first polymeric sheet 20 in the mold assembly 30 may be so that the etched feature 12A is at least partially on a curved portion 60 of the bladder element 10 corresponding to a curved portion 39 of the mold surface 34A. In other words, in step 108, the first polymeric sheet 20 is disposed on the first mold surface 34A, so that the etched feature 12A will be on the curved portion 60 of the bladder element 10 when the bladder element 10 is formed.

The method 100 may further comprise treating the surface 40, 41 of the bladder element 10 in step 122 to achieve at least one of a predetermined level of opacity, transparency, or luster of the bladder element 10. This treatment may occur after conforming the first polymeric sheet 20 to the mold surface 34A to at least partially form the bladder element 10. Treating the surface 40, 41 of the bladder element 10 may be by at least one of heating the surface 40, 41 of the bladder element 10 in sub-step 124, or by applying a softening agent to the surface 40, 41 of the bladder element 10 in sub-step 126. As previously discussed, in some embodiments, a first area 61 of the surface 40 of the bladder element 10 may be treated to achieve a first predetermined level of opacity, transparency, or luster. A second area 63 of the surface 40 of the bladder element 10 may have a second predetermined level of opacity, transparency, or luster that is at least ten percent greater than or at least ten percent less than that of the first predetermined level of opacity, transparency, or luster. The etched feature 12A may be on at least one of the first area 61 or the second area 63 of the surface 40 of the bladder element 10.

The method 100 may further comprise inflating the bladder element 10 in step 128, such as by filling the sealable internal cavity 23 with a fluid, such as air, nitrogen, or another gas, and then sealing the sealable internal cavity 23 in step 130 so that the fluid is retained in the sealable internal cavity 23. In one embodiment, the fluid is a gas at or above ambient pressure.

After any cooling period that may be provided, the mold assembly 30 is opened, and the bladder element 10 is removed from the mold assembly 30. The bladder element 10 with the etched features 12A, 12B, 12C is now complete, or, in an embodiment in which etching occurs after the bladder element 10 is formed and inflated, steps 102, 104, and 106 are carried out. Optionally, if the same entity carrying out steps 102-130 also assembles the bladder element 10 in an article such as the article of footwear 18, then the method 100 can proceed with steps 132 and 134. In step 132, the fluid-filled bladder element 10 is assembled in the sole assembly 16 of the article of footwear 18 by securing the bladder element 10 to the midsole 70. In various embodiments, securing the bladder element 10 to the midsole 70 can be accomplished with adhesive or by forming the midsole 70 around the bladder element 10 in a midsole mold assembly (not shown). In all such embodiments, the bladder element 10 may be assembled in the article of footwear 18 so that the peripheral seam 28 is covered and the etched feature 12A as well as etched feature 12B, if included, are aligned with and exposed to view at openings such as openings 72A, 72B in the midsole 70 as described with respect to the embodiment of FIGS. 9 and 10. In other words, the etched feature 12A is aligned with the opening 72A so that the etched feature 12A is exposed to view through the opening 72A from an exterior of the article of footwear 18. Similarly, the etched feature 12B is aligned with the opening 72B so that the etched feature 12B can be viewed through the opening 72B from an exterior of the article of footwear 18.

Next, in step 134, an outsole can be secured to the midsole 70. If outsole 76A of FIG. 11 is used, the opening 72C is aligned with the etched feature 12C so that the etched feature is exposed to view through the opening 72C. If outsole 76B of FIG. 12 is used, the substantially transparent portion 80 of the outsole 76B is aligned with the etched feature 12C so that the etched feature is exposed to view through the portion 80. As discussed above, the entire outsole 76B may be substantially transparent.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. An article of footwear comprising:
    a sole assembly including at least one of a midsole or an outsole;
    an upper secured to the sole assembly;
    an opening in one of the sole assembly and the upper;
    a fluid-filled bladder element secured to the sole assembly and including a first polymeric sheet that has a surface with an etched feature;
    wherein the fluid-filled bladder element has a sealable internal cavity that retains fluid;
    wherein a first portion of the fluid-filled bladder element with the etched feature is exposed to view through the opening; and
    wherein a second portion of the fluid-filled bladder element is blocked from view by said one of the sole assembly and the upper.

2. The article of footwear of claim 1, wherein the sole assembly includes the outsole, and wherein:
    at least a portion of the outsole is substantially transparent;
    the fluid-filled bladder element is secured to the outsole, and
    the etched feature is exposed to view through the portion of the outsole that is substantially transparent.

3. The article of footwear of claim 1, wherein the etched feature comprises at least one of a protrusion from or a recess in the surface of the fluid-filled bladder element.

4. The article of footwear of claim 1, wherein:
    the first polymeric sheet has a first thickness; and
    the etched feature has a maximum depth into the first polymeric sheet of not more than about one-half of the first thickness.

5. The article of footwear of claim 1, wherein:
    the first polymeric sheet comprises a gas barrier polymer; and
    the gas barrier polymer is not compromised by the etched feature.

6. The article of footwear of claim 1, wherein:
    a first area of the surface of the fluid-filled bladder element has a first predetermined level of opacity, transparency or luster;
    a second area of the surface of the fluid-filled bladder element has a second predetermined level of opacity, transparency or luster that is at least ten percent greater than or at least ten percent less than the first predetermined level of opacity, transparency or luster; and
    the etched feature is on at least one of the first area or the second area.

7. The article of footwear of claim 1, wherein the fluid-filled bladder element has a curved portion, and the etched feature is on the curved portion.

8. The article of footwear of claim 1, further comprising:
    a colored medium on the first polymeric sheet; and
    wherein the etched feature is adjacent to or on the colored medium on the first polymeric sheet.

9. The article of footwear of claim 1, wherein:
    the fluid-filled bladder element has a peripheral seam that at least partially seals the sealable internal cavity;
    the etched feature is spaced apart from the peripheral seam.

10. The article of footwear of claim 1, wherein the first polymeric sheet comprises a thermoplastic polyurethane (TPU); and wherein the TPU is present on at least an outer surface of the first polymeric sheet.

11. The article of footwear of claim 10, wherein first polymeric sheet comprises a multi-layer polymeric sheet.

12. The article of footwear of claim 11, wherein the multi-layer polymeric sheet is a laminate membrane having:
    at least a first layer comprising the TPU; and
    at least a second layer comprising a gas barrier polymer.

13. The article of footwear of claim 12, wherein the gas barrier polymer is an ethylene-vinyl alcohol copolymer.

14. The article of footwear of claim 1, wherein the fluid-filled bladder element has a gas transmission rate for nitrogen of less than 10 cubic centimeters per square meter per atmosphere per day, or of less than 1 cubic centimeter per square meter per atmosphere per day.

15. The article of footwear of claim 1, wherein the sealable internal cavity is filled with a gas at or above ambient pressure.

16. The article of footwear of claim 1, further comprising:
a topcoat secured to the fluid-filled bladder element over the etched feature; and wherein the topcoat is substantially transparent so that the etched feature is exposed to view through the topcoat.

17. The article of footwear of claim 1, wherein the surface of the fluid-filled bladder element has an impression imparted thereon.

18. The article of footwear of claim 17, wherein the etched feature is at least partially aligned with the impression.

19. The article of footwear of claim 17, wherein:
the surface of the fluid-filled bladder element having the impression is an outer surface; and
the etched feature is on one of the outer surface or an inner surface of the fluid-filled bladder element.

20. The article of footwear of claim 17, further comprising:
a colored medium applied to the first polymeric sheet; and
wherein at least one of the etched feature or the impression is adjacent to or on the colored medium.

* * * * *